G. A. SNYDER.
SELF OILING PULLEY.
APPLICATION FILED AUG. 18, 1908.
956,607.
Patented May 3, 1910.
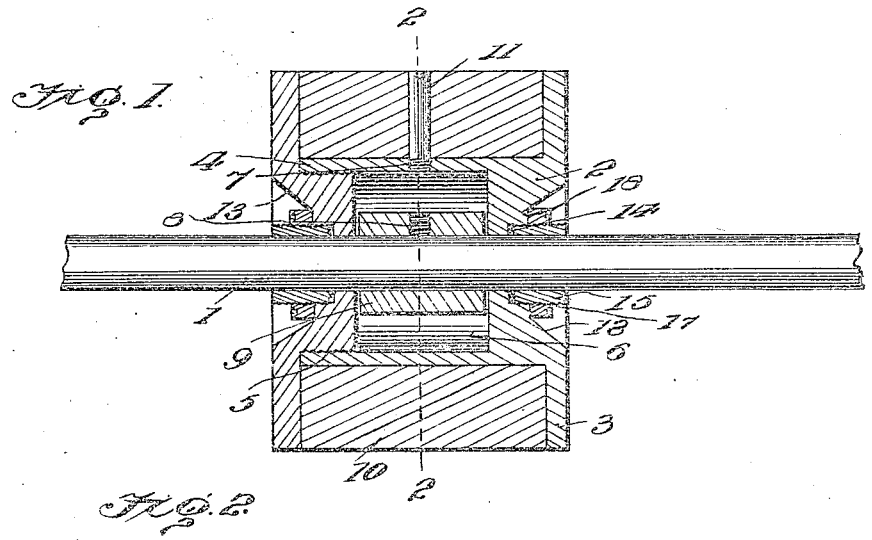
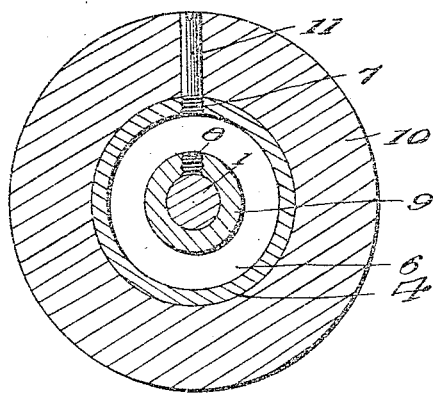
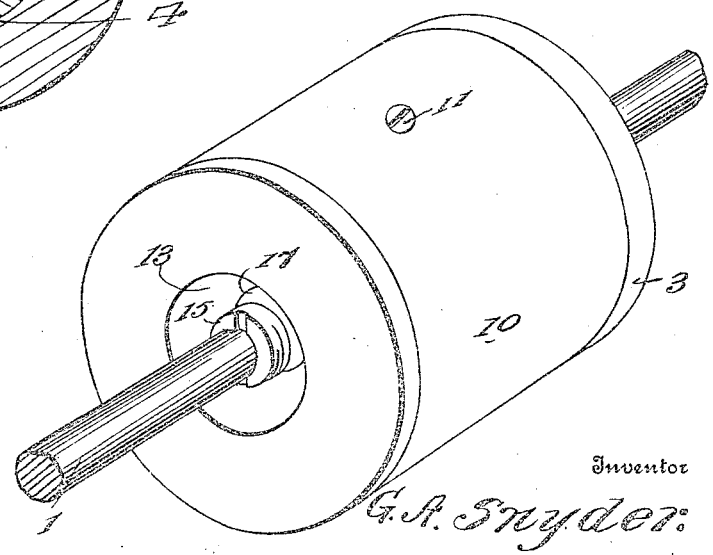
Inventor
G. A. Snyder

UNITED STATES PATENT OFFICE.

GEORGE A. SNYDER, OF MONTGOMERY, MICHIGAN, ASSIGNOR OF ONE-HALF TO ARLESS C. OVERLY, OF CAMDEN, MICHIGAN.

SELF-OILING PULLEY.

956,607. Specification of Letters Patent. Patented May 3, 1910.

Application filed August 18, 1908. Serial No. 449,183.

*To all whom it may concern:*

Be it known that I, GEORGE A. SNYDER, a citizen of the United States, residing at Montgomery, in the county of Hillsdale and State of Michigan, have invented certain new and useful Improvements in Self-Oiling Pulleys, of which the following is a specification.

The object of my invention is to provide means whereby a moving body such as a loose pulley rotating upon a shaft may be made self lubricating.

In the operation of lathes and analogous machinery a pulley commonly known as an idler or loose pulley rotating loosely upon the operating shaft of the machine, is employed for the purpose of receiving the belt when shifted from the fixed pulley when the machine is not in operation. Devices of this character constructed to carry the lubricant within its body portion and regulate the distribution of oil upon the bearing surfaces are not entirely new but with my present invention a more effective method is employed for the retention and economic distribution of the lubricant.

A further object of my invention is to reduce the cost of production of such pulleys without detracting from their strength or durability and this I accomplish by use of a non-metallic belting surface and the unique construction and arrangement of the several parts in connection therewith.

For a full understanding of the invention and the means for effecting the results, reference is to be had to the following description and accompanying drawings, in which:

Figure 1 is a longitudinal section of my improved device; Fig. 2 a transverse section on line 2—2 of Fig. 1; and, Fig. 3 a perspective view of the pulley mounted upon a shaft.

Corresponding and like parts are referred to in the following description and indicated in all the views of the drawings by the same reference characters.

Referring to the drawings, the numeral 1 designates an ordinary shaft, and 2 the hubs of a pulley or other rotating body made of any suitable material and bored or otherwise formed to fit upon the shaft.

At the outer edge of each of the hubs 2 and formed integral therewith are flanges 3, one of said hubs at its inner edge being provided with a hollow cylindrical core or shell 4, and the other hub threaded on its outer face and adapted to engage the threads on the inner face of the core 4 at its open end, as shown at 5. In this position the hubs 2 form an oil chamber 6 within the core 4 into which oil is admitted by means of the threaded opening 7. Within the oil chamber 6 and fixed upon the shaft 1 as by a set screw 8 as shown, is an adjustable collar 9, the ends thereof loosely abutting the ends of the hubs 2 and allowing sufficient space for the flow of oil from the chamber 6 to the bearing surfaces. By means of a collar 9, the pulley is secured to the shaft and is prevented from any lateral movement therealong. The collar 9 being adjustable along the shaft, also permits the pulley to be adjusted to any position desired.

The numeral 10 designates a cylindrical body portion bored or otherwise formed to fit upon the core 4 and between the flanges 3, and constitutes the main body of the pulley. The said main body portion 10 is preferably made of wood or fibrous material possessing qualifications necessary for producing a good contact surface for a belt, and by the use of such material the cost of production is reduced owing to the elimination of patterns, forms and casts as would be necessary if other materials were used. The body 10 is held rigidly in position upon the core 4 by means of a screw bolt 11 passing through an opening therein, the threaded end of said bolt engaging the threaded opening 7 in the core 4 and effectually closing said opening.

The hubs are centrally bored for the passage of the shaft 1, and the exterior face of each of the hubs is formed with an annular depression 13, the sides of this depression being preferably frusto-conical and the depression being carried still farther into the interior of the hub in the form of an annular channel in which packing may be carried.

The numeral 15 designates nuts extending around the shaft 1, and provided with threaded outer surfaces adapted to engage the threaded portion of the openings forming the packing boxes 14 and compress the fiber or other packing into proper relation with the shaft 1 and hubs 2. Threaded annular rings 17 adapted to engage the threaded surface of the nuts 15 and abut a suitable abutting surface formed in the openings 13 in the hubs, as shown at 18, are placed around said nuts 15 and serve as a nut lock therefor.

With the arrangement shown, the operation is as follows:—Lubricant of any desired consistency is introduced into the chamber 6 through an opening in the main body portion 10 and the opening 7 in the core 4. The screw bolt 11 is then adjusted into this opening and screwed into position, thereby holding the main body portion rigidly in place and retaining the oil or lubricant within the chamber. The oil thus retained will pass between the ends of the hubs 2 and collar 9 along the shaft 1 to the packing boxes 14 where outward movement is arrested by the fiber packing contained therein. It will readily be seen that all bearing surfaces are in connection with an interior reservoir of oil by which they are constantly supplied to a degree necessary, and with a minimum of leakage or waste, for the reason that the centrifugal action of the pulley does not throw the oil away from the bearings as it would do if the bearings were merely connected to an oil cup attached to the pulley.

It will be seen that my invention provides a pulley which may be easily lubricated and kept filled with oil for a considerable length of time, the oil being contained within the body of the pulley. The pulley also is of an extremely simple construction and provides for a very ready attachment of the fibrous body portion 10, permitting the pulley to be made at a very reasonable cost.

Having thus described the invention, what is claimed as new is:—

1. A pulley formed of two lateral sections adapted to be engaged with each other to form a barrel and inclosing an oil chamber, a cylindrical non-metallic body portion surrounding the barrel, said body portion and barrel having alined passages leading to the oil holding chamber, a plug closing the passages through the body portion and barrel and holding the body portion to the barrel, and a collar located within the barrel but of smaller diameter than the same, said collar being approximately equal in length to the space between the inner faces of the sections forming the pulley and being thereby adapted to hold the pulley from lateral movement, and means on the collar for holding it in place on a shaft.

2. A pulley comprising a hub made in two sections, one of said sections having an outwardly projecting flange and a transversely extending cylindrical barrel, the other of said sections having a hub adapted to enter and have screw threaded engagement with the interior of the barrel and provided with an outwardly projecting flange, a cylindrical non-metallic body portion surrounding the barrel and held between the flanges of the hub, said body portion and barrel having alining passages, a plug closing the passages through the body portion and barrel, stuffing boxes on each of the hubs adapted to surround a shaft passing through the hubs, and a collar located within the barrel but of smaller diameter than the same, said collar being approximately equal in length to the space between the inner faces of the hubs, and means on the collar for holding it in place upon the shaft.

In testimony whereof I affix my signature in presence of two witnesses.

GEORGE A. SNYDER. [L. S.]

Witnesses:
 W. S. DAY,
 ENOCH C. WHITE.